(12) United States Patent
Trichina et al.

(10) Patent No.: US 7,292,060 B2
(45) Date of Patent: Nov. 6, 2007

(54) LOGIC CIRCUIT AND METHOD THEREOF

(75) Inventors: Elena Trichina, Suwon-si (KR);
Joong-Chul Yoon, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 168 days.

(21) Appl. No.: 11/035,077

(22) Filed: Jan. 14, 2005

(65) Prior Publication Data

US 2005/0184760 A1 Aug. 25, 2005

(30) Foreign Application Priority Data

Feb. 19, 2004 (KR) .................. 10-2004-0010975

(51) Int. Cl.
*H03K 19/00* (2006.01)
(52) U.S. Cl. .............................. 326/8; 326/10; 326/104
(58) Field of Classification Search ............... 326/8–9, 326/104
See application file for complete search history.

(56) References Cited

U.S. PATENT DOCUMENTS

| 6,295,606 | B1 | 9/2001 | Messerges et al. |
| 6,851,052 | B1* | 2/2005 | Graveman .................. 713/168 |
| 2001/0053220 | A1 | 12/2001 | Kocher et al. |
| 2004/0215947 | A1* | 10/2004 | Ward et al. ................. 712/245 |

FOREIGN PATENT DOCUMENTS

| JP | 2000-066585 A | 3/2000 |
| JP | 2002-366029 A | 12/2002 |

\* cited by examiner

*Primary Examiner*—Anh Q. Tran
(74) *Attorney, Agent, or Firm*—Harness, Dickey & Pierce, P.L.C.

(57) ABSTRACT

An example embodiment of the present invention relates to a method of executing a logic operation while remaining safe from side channel attacks. Another example embodiment of the present invention relates to a logic circuit and device for executing a logic operation while remaining safe from side channel attacks.

35 Claims, 5 Drawing Sheets

$(a_1 \vee a_2) \oplus r_3$

LOGIC CIRCUIT AND METHOD THEREOF

CROSS-REFERENCE TO RELATED APPLICATIONS

This U.S. non-provisional patent application claims priority under 35 U.S.C. § 119 of Korean Patent Application 2004-10975 filed on Feb. 19, 2004, the entire contents of which are hereby incorporated by reference.

BACKGROUND OF THE INVENTION

1. Field of the Invention

Example embodiments of the present invention relate generally to a logic circuit and method thereof and more particularly to a logic circuit for performing a logic operation not meeting an associative law and method thereof.

2. Description of the Related Art

Conventional methods for processing data may include a key for security. The data encoded with the key may be extracted by measuring a power dissipation occurring during an operation of a cryptography algorithm and/or timing the execution of the operation.

A leakage or exposure of data during extraction with a cryptography algorithm may be referred to as a side channel and a method for receiving the side channel may be referred to as a side channel attack. Side channel attacks may include a timing attack, a fault insertion attack, a power analysis attack, etc.

In an example, a smart card system with an installed co-processor for cryptographic processing may have a higher possibility of a side channel because the smart card system may execute a higher number of logic operations (e.g., AND, OR, XOR, etc. . . . ).

A conventional differential power analysis (DPA) may measure and analyze power dissipation in logic operations of the cryptograph algorithm, thereby extracting the data. Thus, installing a defense against DPA may increase the security for a given system.

One conventional defensive method, referred to as random masking, may include applying a cryptography algorithm after data is received and random data is included. If the received data is processed with a logical operation satisfying an associative law, data may not be extracted by a side channel attack because power dissipation during the cryptography algorithm execution may not result in the input data.

Another conventional random masking method may include applying an XOR operation to the input data and the random data as given by $$/a = a \oplus r \quad (1.1)$$

where the input data is a, the random data is r, the random mask data is /a, and an XOR operation is denoted by $\oplus$. It is well known that XOR operations satisfy the associative law (e.g., $a \oplus r = r \oplus a$, $(a \oplus r) \oplus x = a \oplus (r \oplus x)$, etc. . . . ).

The data generated during the cryptography algorithm operation may be maintained in a random mask in order to apply a logical operation satisfying an associative law (e.g., an XOR operation) to the input data while remaining unreadable with conventional DPA. In this case, the data included in the random mask type may include both processed data and random data.

In another example, it may be assumed that a cryptography algorithm may apply an XOR operation to an input data 'a' and a key k. To prevent the DPA from extracting the input data a, random data r may be generated in order to attain the random mask data /a as given in Expression 1.1. If an XOR operation is applied to the random mask data /a and key k, the result may be given by $$/a \oplus k = (a \oplus r) \oplus k \quad (1.2)$$

Thus, a result of the XOR operation (i.e., $a \oplus k$) may be achieved without exposing data to extraction by DPA since the random data r is included within Expression 1.2. Further, the result of the XOR operation may not be exposed.

In another example, the cryptography algorithm may not include an AND operation applied to the data a and the key k1 as given by $$/a \wedge k = (a \oplus r) \wedge k \quad (1.3)$$

where $\wedge$ denotes an AND operation, while remaining secure from side channel attacks.

Referring to Expression 1.3, the AND operation may not satisfy the associative law, as given by $$/A \wedge k \neq (A \wedge k) \oplus r. \quad (1.4)$$

Thus, by conventional methods, logic operations (e.g., AND, OR, etc. . . . ) which do not satisfy the associative law may not be included in the cryptography algorithm without risking exposure to DPA.

SUMMARY OF THE INVENTION

An example embodiment of the present invention is a logic circuit, including a random data generator for generating random data, a random mask device for generating random mask data based on received input data and the random data, and a logic device for executing a logic operation including the random mask data and outputting the results of the execution in a random mask type, the logic operation not satisfying an associative law.

Another example embodiment of the present invention is a method of executing a logic operation, including generating random mask data based on received input data and generated random data, executing at least one logic operation including at least one of the random mask data, the random data and random mask type data, the at least one logic operation including a logic operation not satisfying the associative law, and outputting the result of the at least one logic operation applied in a random mask type.

Another example embodiment of the present invention is a method of executing a logic operation, including executing at least one logic operation including a random mask, the at least one logic operation not satisfying an associative law, the at least one logic operation not being able to be monitored with a differential power analysis (DPA).

Another example embodiment of the present invention is a logic circuit for executing a logic operation not satisfying an associative law, including a first logic gate for executing a first logic operation, the first logic operation satisfying the associative law, a second logic gate for executing a second logic operation, the second logical operation not satisfying the associative law, a third logic gate for executing a third logic operation, the third logic gate receiving the outputs of the first and second logic gates, the third logic operation not satisfying the associative law.

Another example embodiment of the present invention is a method of executing a logic operation, including executing a first logic operation on first and second data, the first logic operation satisfying an associative law, executing a second logic operation on first and second random data, the second logic operation not satisfying the associative law, and executing a third logic operation on the results of the first and second logic operation, the third logic operation not satisfying the associative law.

Another example embodiment of the present invention is a method of logic operation, including executing a logic operation not satisfying an associative law on first and second data, the first and second data not being able to be monitored with a side channel attack during the logic operation.

BRIEF DESCRIPTION OF THE DRAWINGS

Example embodiments of the present invention will become more apparent by describing in detail exemplary embodiments thereof with reference to the attached drawings in which.

DETAILED DESCRIPTION OF EXAMPLE EMBODIMENTS OF THE PRESENT INVENTION

Hereinafter, example embodiments of the present invention will be described in detail with reference to the accompanying drawings.

In the Figures, the same reference numerals are used to denote the same elements throughout the drawings.

Figure 1:
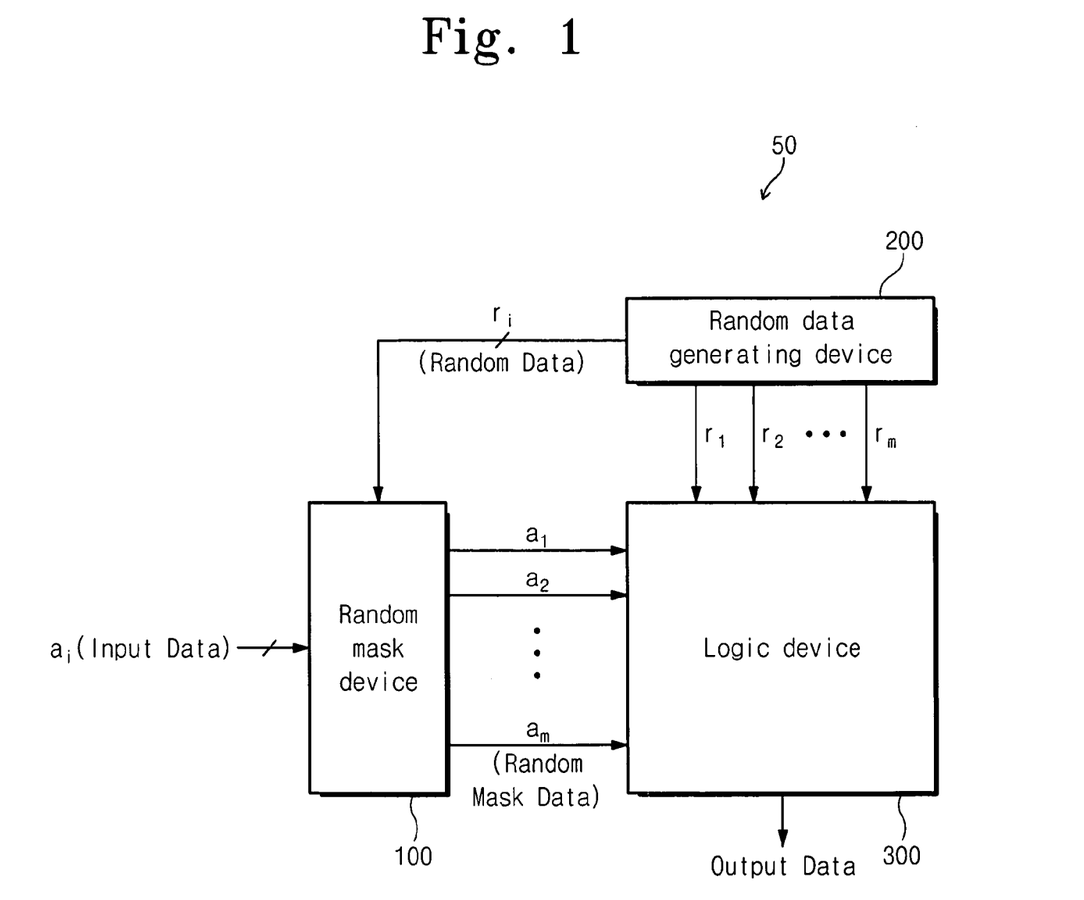
FIG. 1 illustrates a block diagram of a logic circuit including a logic device according to an example embodiment of the present invention.

FIG. 1 illustrates a block diagram of a logic circuit 50 including a logic device 300 according to an example embodiment of the present invention.

In another example embodiment of the present invention, referring to FIG. 1, the logic circuit 50 may include a random mask device 100, a random data generating device, and/or the logic device 300. The logic circuit 50 may execute a logic operation including input data which may not expose the input data to a side channel attack during a logic operation. The logic circuit 50 may output the result of the logic operation with a random mask type.

As shown in FIG. 1, the random mask device 100 may receive input data $a_i$ and random data $r_i$. The random mask device 100 may use the data $a_i$ and random data $r_i$ to generate the random mask data $/a_i$, where $a_i$, $r_i$, and $/a_i$ indicate the ith elements between elements 1-m, m being a natural number.

In another example embodiment of the present invention, the random mask data $/a_1$ may be represented by one of $/a_1 = a_1 \oplus r_1$, $/a_2 = a_2 \oplus r_2$, ... , $/a_m = a_m \oplus r_m$.

In another example embodiment of the present invention, the random data generating device 200 may generate random data $r_1, r_2, \ldots,$ and $r_m$.

In another example embodiment of the present invention, the logic device 300 may receive the random mask data and the random data and may execute a logic operation.

In another example embodiment of the present invention, the logic device 300 may include at least one logic gate (e.g., NOT, AND, OR, etc. . . . ) for executing a logic operation. The logic device 300 may execute the logic operation including the random mask data, the random data and/or data of a random mask type. The logic device 300 may output a result of the logic operation.

Figure 2:
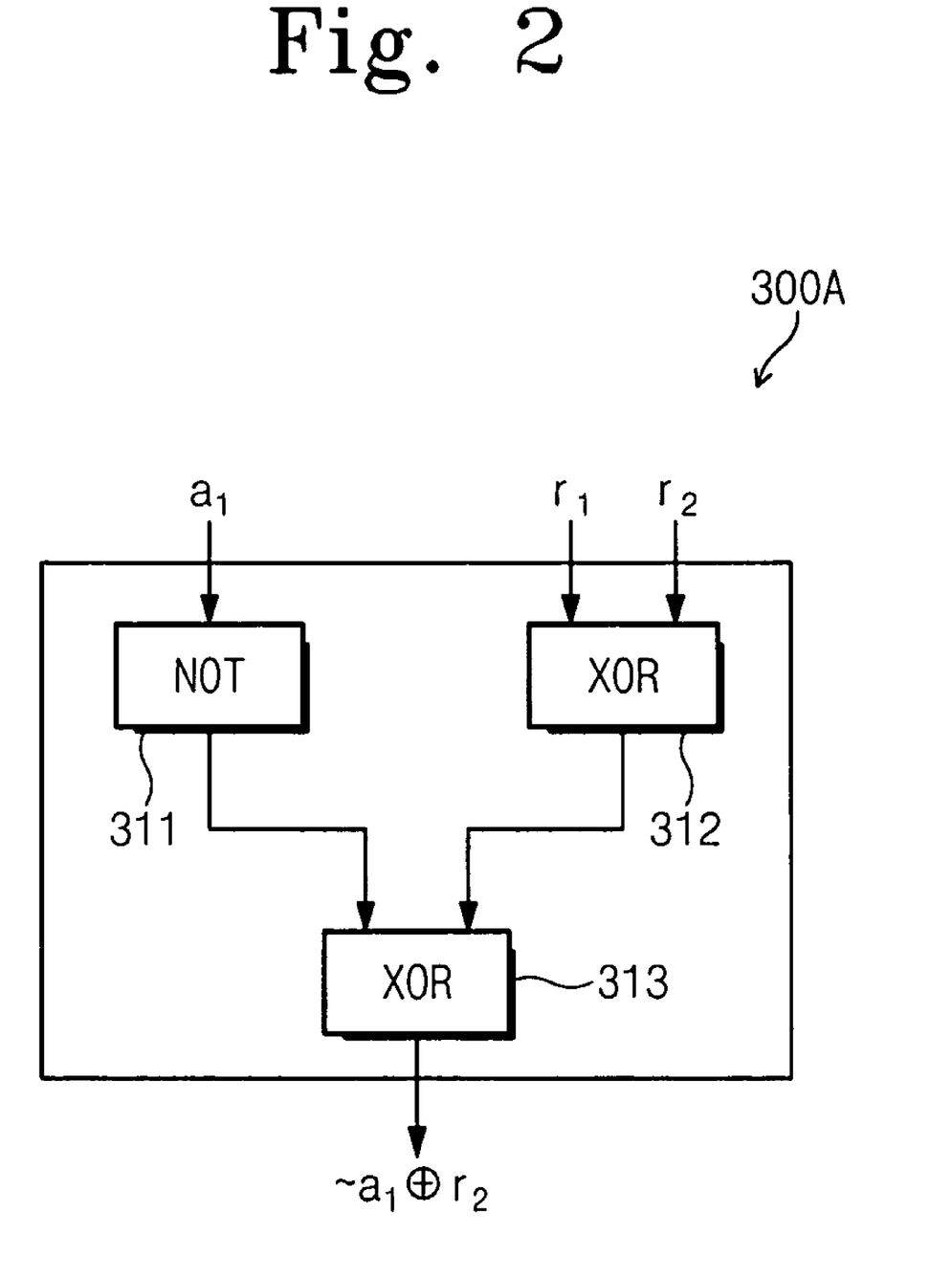
FIG. 2 illustrates a block diagram of a NOT operation device as an example embodiment of the logic device in FIG. 1.

FIG. 2 illustrates a block diagram of a NOT operation device 300A as an example embodiment of the logic device 300 in FIG. 1.

As shown in FIG. 2, the NOT operation device 300A may include a NOT logic gate 311 and first and second XOR logic gates 312 and 313. The NOT logic gate 311 may receive a random mask data $/a_1$ and the first XOR gate 312 may receive random data $r_1$ and $r_2$. The result of the NOT operation at the NOT logic gate 311 may be output in a mask type $\sim a_1 \oplus r_2$. The NOT logic gate 311 may receive the random mask data $/a_1$ and may perform a NOT operation, thereby generating a first intermediate data $\sim/a_1$ (i.e., an inverse of $/a_1$). The first XOR logic gate 312 may receive the first and second random data $r_1$ and $r_2$ and may execute a XOR operation, thereby generating a second intermediate data $r_1 \oplus r_2$. The second XOR logic gate 313 may receive the first and second intermediate data and may execute an XOR operation, thereby generating output data $\sim/a_1 \oplus (r_1 \oplus r_2)$ as given by $$\sim/a1 \oplus (r1 \oplus r2) = (\sim/a1 \oplus r1) \oplus r2 = \sim a1 \oplus r2 \quad (2.1)$$

Table 1 below illustrates example values based on Expression 2.1 as described above.

TABLE 1

| a1 | r1 | /a1 | ~/a1 | ~/a1 ⊕ r1 | ~a1 |
|----|----|----|------|-----------|-----|
| 0  | 0  | 0  | 1    | 1         | 1   |
| 0  | 1  | 1  | 0    | 1         | 1   |
| 1  | 0  | 1  | 0    | 0         | 0   |
| 1  | 1  | 0  | 1    | 0         | 0   |

Referring to Table 1, since $(\sim/a1 \oplus r1) = \sim a1$, the output of the NOT operation device 300A may be $\sim a1 \oplus r2$ as illustrated in FIG. 2.

In another example embodiment of the present invention, the NOT operation device 300A may reduce a side channel attack based on a differential power analysis (DPA).

In another example embodiment of the present invention, the NOT operation device 300A may execute a logical operation using the random mask data $/a1$ and at least one of the random data $r_1$ and $r_2$ and may output a result of the NOT operation applied to the input data $a1$ in a random mask type (e.g., $\sim a1 \oplus r2$).

In another example embodiment of the present invention, if each of the random mask data and the first and second random data is n-bit data, n being a natural number, the NOT operation may be applied at corresponding bits. For example, when 4-bit random mask data $/A = (/a_3, /a_2, /a_1, /a_0)$, 4-bit random data $R_1 = (r_3/r_2/r_1/r_0)$, and $R_2 = (s_3/s_2/s_1/s_0)$, and output data of the NOT operation may be given as $$\sim A_i \oplus R_2 = \{(\sim a_3 \oplus s_3), (\sim a_2 \oplus s_2), (\sim a_1 \oplus s_1), (\sim a_0 \oplus s_0)\} \quad (2.2)$$

Figure 3:
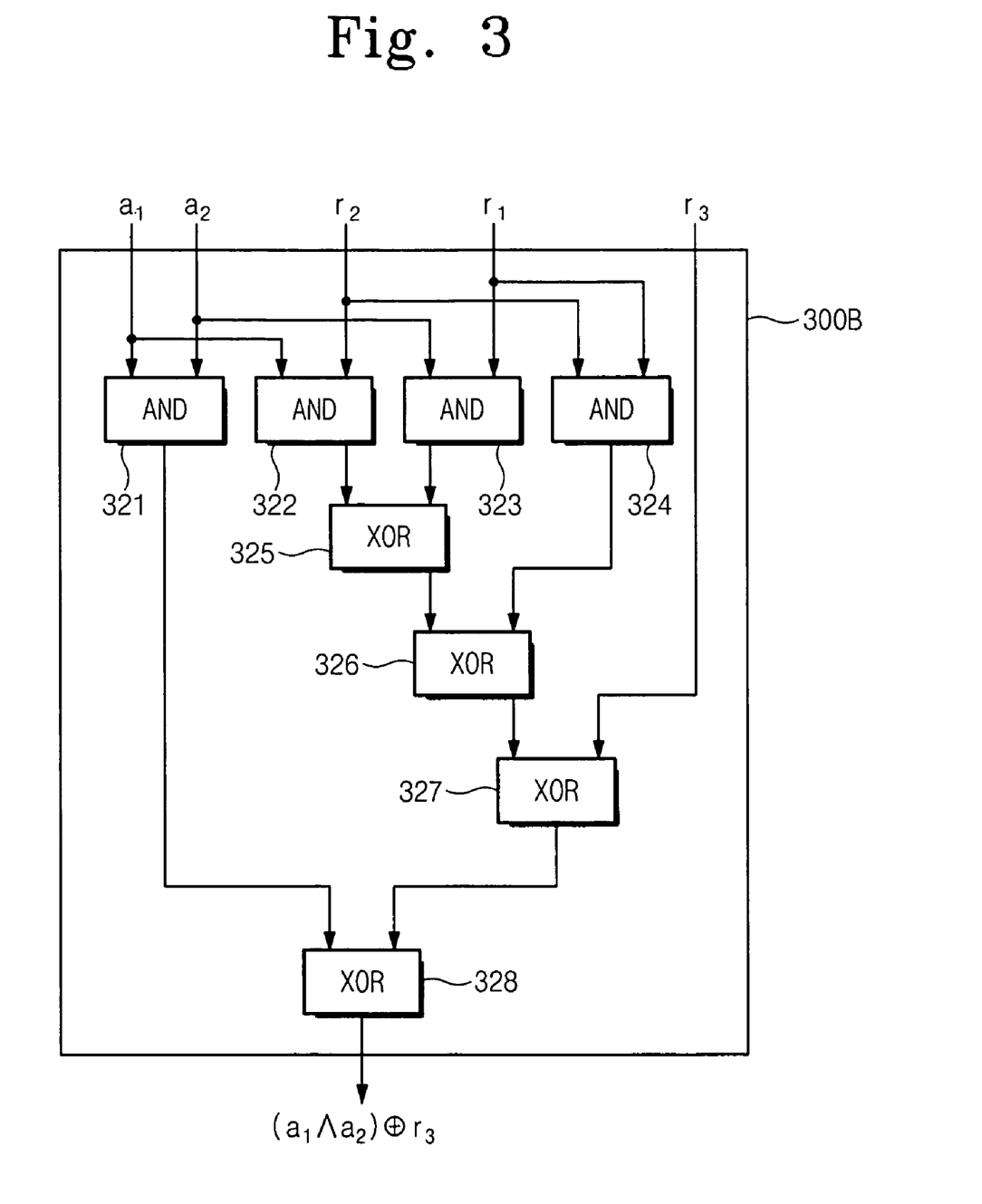
FIG. 3 illustrates a block diagram of an AND operation device as an example embodiment of the logic device in FIG. 1.

FIG. 3 illustrates a block diagram of an AND operation device 300B as an example embodiment of the logic device 300 in FIG. 1.

In another example embodiment of the present invention, referring to FIG. 3, the AND operation device 300B may include logic gates 321/322/323/324 and XOR gates 325/326/327/328.

Referring to FIG. 3, the AND operation device 300B may receive random mask data /a1 and /a2 and random data $r_1/r_2/r_3$ and may output results of an AND operation executed to the input data a1 and a2 in a random mask type (e.g., (a1⊕a2)⊕r3).

In another example embodiment of the present invention, referring to FIG. 3, the first AND logic gate 321 may receive the random mask data /a1 and /a2 to execute an AND operation and may generate first intermediate data /a1∧/a2. The second AND logic gate 322 may receive first mask data /a1 and second random data r2 to execute an AND operation and may generate a second intermediate data /a1∧r2. The third AND logic gate 323 may receive the second random mask data /a2 and the first random data r1 to execute an AND operation to generate a third intermediate data /a2∧r1. The fourth AND logic gate 324 may receive the first and second random data r1 and r2 to execute an AND operation to generate a fourth intermediate data r1∧r2.

The first XOR logic gate 325 may receive the second intermediate data (/a1∧r2) and the third intermediate data (/a2∧r1) to execute an XOR operation and may generate a fifth intermediate data given by $$(/a1 \wedge r2) \oplus (/a2 \wedge r1) \quad (2.3)$$

The second XOR logic gate 326 may receive a fourth intermediate data (r1∧r2) and the fifth intermediate data given in Expression 2.3 to execute an XOR operation to generate a sixth intermediate data as given by $$(/a1 \wedge r2) \oplus (/a2 \wedge r1) \oplus (r1 \wedge r2). \quad (2.4)$$

The third XOR logic gate 327 may receive the sixth intermediate data as given by Expression 2.4 and the third random data r3 to execute an XOR operation to generate a seventh intermediate data as given by $$(/a1 \wedge r2) \oplus (/a2 \wedge r1) \oplus (r1 \wedge r2) \oplus r3 \quad (2.5)$$

The fourth XOR logic gate 328 may receive the first intermediate data (/a1∧/a2) and the seventh intermediate data as given in Expression 2.6 to execute an XOR operation to generate output data as given by $$(/a1 \wedge /a2) \oplus \{(/a1 \wedge r2) \oplus (/a2 \wedge r1) \oplus (r1 \wedge r2) \oplus r3. \quad (2.6)$$

Thus, the following relationships may be determined as given by $$(/a1 \wedge /a2) = (a1 \oplus r1) \wedge (a2 \oplus r2) = (a1 \wedge a2) \oplus (a1 \wedge r1 \wedge r2) \quad (2.7)$$

$$(/a1 \wedge r2) = (a1 \oplus r1) \wedge r2 = (a1 \wedge r2) \oplus (r1 \wedge r2) \quad (2.8)$$

$$(/a2 \wedge r1) = (a2 \oplus r2) \wedge r1 = (a2 \wedge r1) \oplus (r1 \wedge r2) \quad (2.9)$$

which may indicate $$(/a2 \wedge /a2) \oplus \{(/a2 \wedge r1) \oplus (/r1 \wedge r2) \oplus r3\} = \{(/a1 \wedge / (/a1 \wedge r2) \oplus (/a2 \wedge r1) \oplus (r1 \wedge r2) \oplus (r1 \wedge r2)\} \oplus r3 = ((a \quad (2.11)$$

Thus, when the Expressions 2.8, 2.9 and 2.10 are substituted in the Expression 2.11 the same output data (a1∧a2)⊕r3 may be achieved.

In another example embodiment of the present invention, the AND operation device 300B may include the random mask data /a1 and /a2 and the random data r1, r2 and r3 and may perform a logic operation. The AND operation device 300B may output the result of the AND operation applied to the input data a1 and a2 in a random mask type.

In another example embodiment of the present invention, when the random mask data and the random data are n-bit data, n being a natural number, the AND operation may be applied at corresponding bits. For example, when 4-bit random mask data /A=(/$a_3$, /$a_2$, /$a_1$, /$a_0$), 4-bit random data $R_1=(r_3/r_2/r_1/r_0)$, and $R_2=(s_3/s_2/s_1/s_0)$, the output data of the NOT operation given as shown in Expression 2.2.

Figure 4:
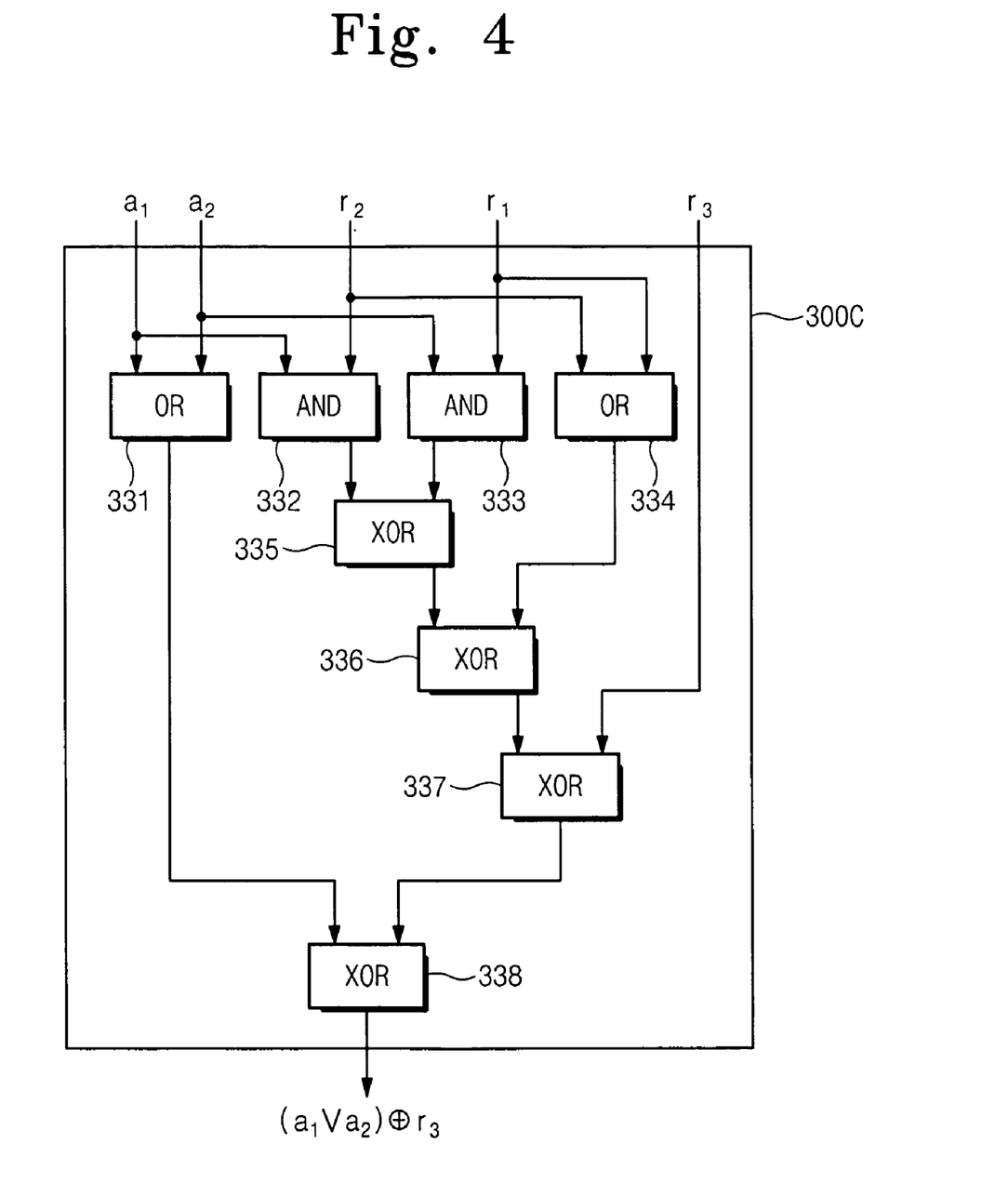
FIG. 4 illustrates a block diagram of an OR operation device as an example embodiment of the logic device in FIG. 1.

FIG. 4 illustrates a block diagram of an OR operation device 300C as an example embodiment of the logic device 300 in FIG. 1.

Referring to FIG. 4, the OR operation device 300C may receive random mask data /a1 and /a2 and random mask data r1, r2 and r3. The result (a1∨a2) of an OR operation applied to the input data a1 and a2 may be output in a random mask type ((a1∨a2)⊕r3). The OR operation device 300C may include first and second OR logic gates 331 and 334, first and second AND logic gates 332 and 333, and/or XOR logic gates 335/336/337/338.

In another example embodiment, the OR operation device 300C may function similar to the above-described AND operation device 300B of FIG. 2 except for the inclusion of OR logic gates 331 and 334 in place of AND logic gates 321 and 324 in FIG. 3. Thus, the OR operation device may generate output data as given by 300C.

$$(/a1 \wedge r2) \oplus (/a2 \wedge r1) \oplus (r1 \vee r2) \oplus r3 = (a1 \vee a2) \oplus r3 \quad 3.1$$

The OR operation device 300C may execute logic operations using the random mask data /a1 and /a2 and the random data r1, r2 and/or r3, and may output the result (a1∨a2) in a random mask type (a1∨a2)⊕r3.

In another example embodiment of the present invention, when the random mask data and the random data are n-bit data, n being a natural number, an OR operation may be applied to the random mask data and the random data at corresponding bits.

Figure 5:
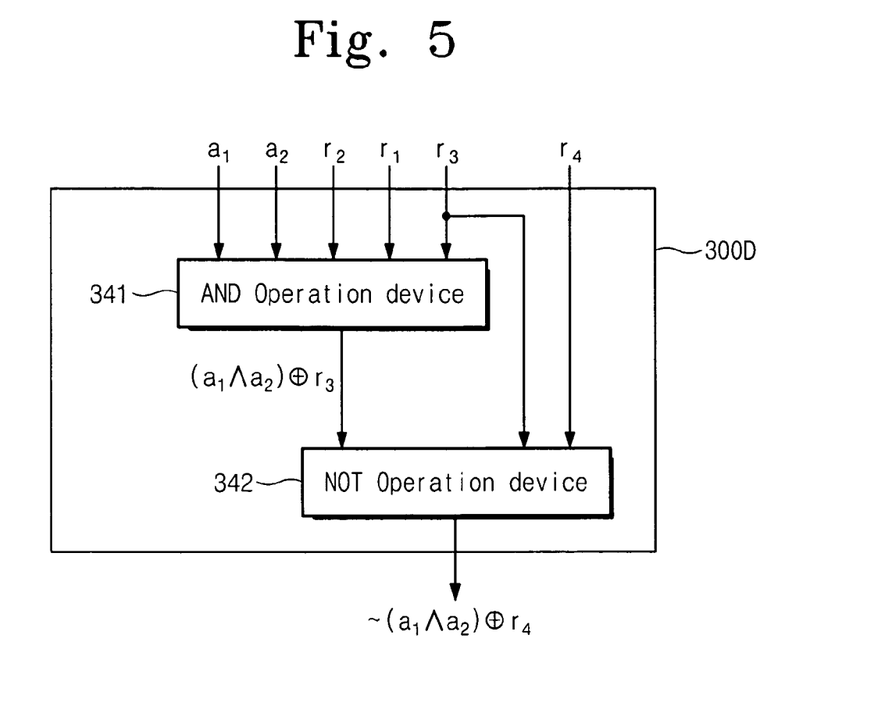
FIG. 5 illustrates a block diagram of a NAND operation device as an example embodiment of the logic device in FIG. 1.

FIG. 5 illustrates a block diagram of an NAND operation device 300D as an example embodiment of the logic device 300 in FIG. 1.

Referring to FIG. 5, the NAND operation device 340 may receive two random mask data /a1 and /a2 and random data r1, r2, r3 and/or r4. The output of the NAND operation device 300D ~(a1∧a2) may be applied in a random mask type ~(a1∧a2)⊕4. The NAND operation device 300D may include an AND operation device 341 and a NOT operation device 342.

In another example embodiment of the present invention, the AND operation device 341 may function as an AND operation device (e.g., AND operation device 300B of FIG. 3). The AND operation device 341 may receive random mask data /a1 and/or /a2 and random data r1, r2 and/or r3 and may generate a first intermediate data (a1∧a2)⊕r3.

In another example embodiment of the present invention, the NOT operation 342 may function as a NOT operation device (e.g., NOT operation device 300A of FIG. 2).

In another example embodiment of the present invention, if (a1∧a2) is equivalent to a3 in the first intermediate data (a1∧a2)⊕r3, the first intermediate data may be a3⊕r3. The first intermediate data may include a random mask data (e.g., /a3=a3⊕r3). The NOT operation device 342 may receive the random mask data /a3 and random data r3 and r4 and may generate output data ~a3⊕r4. In this example, since a3 may be equivalent to a1∧a2, the output data of the NAND operation device 300D may be ~(a1∧a2)⊕r4.

In another example embodiment of the present invention, the NAND operation device 300D may execute logic operations using the random mask data /a1 and /a2 and the random data r1, r2, r3 and/or r4 and may output the result ~(a1∧a2) of the NAND operation in a random mask type ~(a1∧a2)⊕r4.

In another example embodiment of the present invention, when the random mask data and the random data are n-bit data, n being a natural number, a NAND operation may be applied to the random mask data and the random data at corresponding bits.

Figure 6:
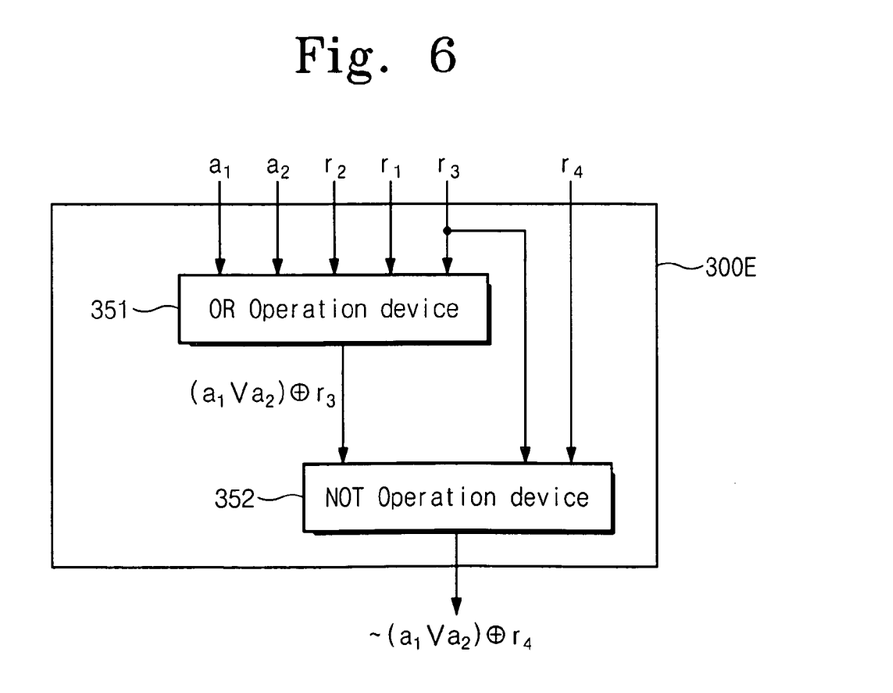
FIG. 6 illustrates a block diagram of a NOR operation device as an example embodiment of the logic device in FIG. 1.

FIG. 6 illustrates a block diagram of a NOR operation device 300E as an example embodiment of the logic device 300 in FIG. 1.

Referring to FIG. 6, the NOR operation device 300E may receive random mask data /a1 and/or /a2 and random data r1, r2, r3 and/or r4. The NOR operation device 300E may include an OR operation device 351 and a NOT operation device 352.

In another example embodiment of the present invention, referring to FIG. 6, the NOR operation device 300E may function similar to the above-described NAND operation device 300D of FIG. 5 except for the inclusion of the OR operation device 341 (e.g., OR operation device 300C of FIG. 4) in place of the AND operation device 341.

The NOR operation device 300E may include the random mask data /a1 and/or /a2 and the random data r1, r2, r3 and/or r4 and may output the result ~(a1∨a2) of the NOR operation in a random mask type ~(a1∨a2)⊕r4.

In another example embodiment of the present invention, when the random mask data and the random data are n-bit data, n being a natural number, a NOR operation may be applied to the random mask data and the random data at corresponding bits.

The example embodiments of the present invention being thus described, it will be obvious that the same may be varied in many ways. For example, above-described example embodiments include one of NOT, AND, OR, NAND and NOR operation devices. However, other example embodiments of the present invention may include any well-known arithmetic and/or logic devices (e.g., full adders, half adders, ripple carry adders, comparators, general arithmetic logic units (ALU), etc. . . . ).

Further, above-described example embodiments include four random data (e.g., r1, r2, r3, and r4). However, any number and type of random data may be used in other example embodiments of the present invention.

Basic arithmetic and logic devices according to example embodiments of the present invention may be safe from a side channel attack (e.g., from DPA) because the devices may not expose data during logic operations.

Further, basic arithmetic and logic devices and methods according to example embodiments of the present invention may execute a logic operation (e.g., NOT, AND, OR, NAND, NOR, etc. . . . ) that may satisfy an associative law while remaining safe from a side channel attack. Further, the basic arithmetic and logic devices and methods according to example embodiments of the present invention may be applied to more complex algorithms including the above-described logic operations (e.g., NOT, AND, OR, NAND, NOR, etc. . . . )

Such variations are not to be regarded as departure from the spirit and scope of the example embodiments of the present invention, and all such modifications as would be obvious to one skilled in the art are intended to be included within the scope of the following claims.

What is claimed is:

1. A logic circuit, comprising:
   a random data generator for generating random data;
   a random mask device for generating random mask data based on received input data and the random data; and
   a logic device for executing a Boolean logic operation including the random mask data and outputting the results of the execution in a random mask type, the Boolean logic operation including a first Boolean logic operation not satisfying an associative law and a second Boolean logic operation satisfying an associative law.

2. The logic circuit of claim 1, wherein the logic device includes a NOT operation device.

3. The logic circuit of claim 2, wherein the NOT operation device includes:
   a NOT logic gate for receiving the random mask data;
   a first XOR logic gate for receiving first and second random data, the first and second random data being a portion of the generated random data; and
   a second XOR logic gate for receiving outputs of the NOT and first XOR logic gates.

4. The logic circuit of claim 3, wherein the random mask data and the first and second random data each include n-bits, n being a natural number.

5. The logic circuit of claim 4, wherein the NOT operation is executed based on corresponding bits of the random mask data and the first and second random data.

6. The logic circuit of claim 1, wherein the logic device is an AND operation device.

7. The logic circuit of claim 1, wherein the logic device includes a first at least one logic gate for executing a first Boolean logic operation satisfying the associative law and a second at least one logic gate for executing a second Boolean logic operation not satisfying the associative law.

8. The logic circuit of claim 6, wherein the AND operation device includes:
   a first logic gate for receiving first and second random mask data to execute a first AND operation;
   a second logic gate for receiving the first random mask data and second random data to execute a second AND operation;
   a third logic gate for receiving the second random mask data and first random data to execute a third AND operation;
   a fourth logic gate for receiving the first and second random data to execute a fourth AND operation;
   a fifth logic gate for receiving outputs of the second and third logic gates to execute a first XOR operation;
   a sixth logic gate for receiving outputs of the fourth and fifth logic gates to execute a second XOR operation;
   a seventh logic gate for receiving an output of the sixth logic gate and third random data to execute a third XOR operation; and
   an eighth logic gate for receiving the first and seventh logic gates to execute a fourth XOR operation, the result of the fourth XOR operation being an output of the AND operation device,
   wherein the first, second and third random data are a portion of the generated random data.

9. The logic circuit of claim 8, wherein the first random mask data is the result of a first input data and the first random data being executed with a fifth XOR operation and the second random mask data is the result of a second input data and the second random data being executed with a sixth XOR operation.

10. The logic circuit of claim 8, wherein the random mask data and the first, second and third random data each include n-bits, n being a natural number.

11. The logic circuit of claim 10, wherein the AND operation is executed based on corresponding bits of the random mask data and the first, second and third random data.

12. The logic circuit of claim 1, wherein the logic device is an OR operation device.

13. The logic device of claim 12, wherein the OR operation device includes:
  a first logic gate for receiving first and second random mask data to execute a first OR operation;
  a second logic gate for receiving the first random mask data and second random data to execute a first AND operation;
  a third logic gate for receiving the second random mask and first random data to execute a second AND operation;
  a fourth logic gate for receiving the first and second random data to execute a second OR operation;
  a fifth logic gate for receiving outputs of the second and third logic gates to execute a first XOR operation;
  a sixth logic gate for receiving outputs of the fourth and fifth logic gates to execute a second XOR operation;
  a seventh logic gate for receiving outputs of the sixth logic gate and third random data to execute a third XOR operation; and
  an eighth logic gate for receiving outputs of the first and seventh logic gates to execute a fourth XOR operation, the result of the fourth XOR operation being an output of the OR operation device,
  wherein the first, second and third random data are a portion of the generated random data.

14. The logic circuit of claim 13, wherein the first random mask data is the result of a first input data and the first random data being executed with a fifth XOR operation and the second random mask data is the result of a second input data and the second random data being executed with a sixth XOR operation.

15. The logic circuit of claim 14, wherein the random mask data and the first, second and third random data each include n-bits, n being a natural number.

16. The logic circuit of claim 15, wherein the OR operation is executed based on corresponding bits of the random mask data and the first, second and third random data.

17. The logic circuit of claim 1, wherein the logic device is a NAND operation device.

18. The logic circuit of claim 17, wherein the NAND operation device includes an AND operation device and a NOT operation device.

19. The logic circuit of claim 1, wherein the logic device is a NOR operation device.

20. The logic circuit of claim 16, wherein the NOR operation device includes an OR operation device and a NOT operation device.

21. A method of executing a Boolean logic operation, comprising:
  generating random mask data based on received input data and generated random data;
  executing at least one Boolean logic operation including at least one of the random mask data, the random data and random mask type data, the at least one Boolean logic operation including a first Boolean logic operation satisfying the associative law and a second Boolean logic operation not satisfying the associative law; and
  outputting the result of the at least one Boolean logic operation applied in a random mask type.

22. The method of claim 21, wherein the at least one Boolean logic operation includes a first NOT operation.

23. The method of claim 22, wherein the first NOT operation includes:
  executing a second NOT operation on the random mask data;
  executing a first XOR operation on received first and second random data, the first and second random data being a portion of the generated random data; and
  executing a second XOR operation on the outputs of the NOT operation and the first XOR operation.

24. The method of claim 21, wherein the at least one Boolean logic operation includes a first AND operation.

25. The method of claim 24, wherein the first AND operation includes:
  receiving first and second random mask data to execute a second AND operation, the first and second random mask data being a portion of the generated random mask data;
  receiving the first random mask data and second random data to execute a third AND operation;
  receiving the second random mask data and first random data to execute a fourth AND operation;
  receiving the first and second random data to execute a fifth AND operation;
  receiving outputs of the second and third logic gates to execute a first XOR operation;
  receiving outputs of the fourth and fifth logic gates to execute a second XOR operation;
  receiving an output of the sixth logic gate and third random data to execute a third XOR operation; and
  receiving outputs of the first and seventh logic gates to execute a fourth XOR operation, the output of the fourth XOR operation being the result of the first AND operation,
  wherein the first, second and third random data are a portion of the generated random data.

26. The method of claim 25, wherein the first and second random mask data and the first, second and third random data each include n-bits, n being a natural number.

27. The method of claim 26, wherein the first AND operation is executed based on corresponding bits of the first and second random mask data and the first, second and third random data.

28. The method of claim 21, wherein the at least one Boolean logic operation includes a first OR operation.

29. The method of claim 28, wherein the first OR operation includes:
  receiving first and second random mask data to execute a second OR operation;
  receiving the first random mask data and second random data to execute a first AND operation;
  receiving the second random mask data and first random data to execute a second AND operation;
  receiving the first and second random data to execute a third OR operation;
  receiving outputs of the second and third logic gates to execute a first XOR operation;
  receiving outputs of the third and fourth logic gates to execute a second XOR operation;
  receiving an output of the sixth logic gate and third random data to execute a third XOR operation; and
  receiving outputs of the first and seventh logic gates to execute a fourth XOR operation, the output of the fourth XOR operation being the result of the first OR operation,
  wherein the first, second and third random data are a portion of the generated random data.

30. The method of claim 29, wherein the first and second random mask data and the first, second and third random data each include n-bits, n being a natural number.

31. The method of claim 28, wherein the first OR operation is executed based on corresponding bits of the first and second random mask data and the first, second and third random data.

32. The method of claim 21, wherein the at least one Boolean logic operation includes a NAND operation.

33. The method of claim 32, wherein the NAND operation includes an AND operation and a NOT operation.

34. The method of claim 21, wherein the at least one Boolean logic operation includes a NOR operation.

35. The method of claim 34, wherein the NOR operation includes an OR operation and a NOT operation.

* * * * *